United States Patent
Komiya et al.

(10) Patent No.: US 10,967,723 B2
(45) Date of Patent: Apr. 6, 2021

(54) FLUID-FILLED VIBRATION DAMPING DEVICE

(71) Applicant: SUMITOMO RIKO COMPANY LIMITED, Komaki (JP)

(72) Inventors: Yasuhiro Komiya, Komaki (JP); Shingo Tanaka, Komaki (JP)

(73) Assignee: SUMITOMO RIKO COMPANY LIMITED, Komaki (JP)

(*) Notice: Subject to any disclaimer, the term of this patent is extended or adjusted under 35 U.S.C. 154(b) by 21 days.

(21) Appl. No.: 16/270,934

(22) Filed: Feb. 8, 2019

(65) Prior Publication Data
US 2019/0168596 A1 Jun. 6, 2019

Related U.S. Application Data

(63) Continuation of application No. PCT/JP2018/010983, filed on Mar. 20, 2018.

(30) Foreign Application Priority Data

Jul. 7, 2017 (JP) .............................. JP2017-133927

(51) Int. Cl.
*F16F 13/00* (2006.01)
*B60K 5/12* (2006.01)
*F16F 13/10* (2006.01)

(52) U.S. Cl.
CPC .............. *B60K 5/1208* (2013.01); *B60K 5/12* (2013.01); *F16F 13/10* (2013.01); *F16F 13/103* (2013.01);
(Continued)

(58) Field of Classification Search
CPC ...... F16F 13/103; F16F 13/105; F16F 13/106; F16F 13/107; F16F 13/10
See application file for complete search history.

(56) References Cited

U.S. PATENT DOCUMENTS 4,852,864 A * 8/1989 Bitschkus .............. F16F 13/107
267/219
6,036,183 A * 3/2000 Lee ......................... F16F 13/26
267/140.13
(Continued)

FOREIGN PATENT DOCUMENTS

CN 101135544 A 3/2008
JP 3570638 B2 9/2004
(Continued)

OTHER PUBLICATIONS

Jan. 7, 2020 International Preliminary Report on Patentability issued in International Patent Application No. PCT/JP2018/010983.
(Continued)

*Primary Examiner* — Nicholas J Lane
(74) *Attorney, Agent, or Firm* — Oliff PLC

(57) ABSTRACT

A fluid-filled vibration damping device including an inner member, an outer member having a tubular part, a main rubber elastic body elastically connecting the two members, and a partition disposed on a radially inner side of the tubular part. An axial end portion of the main rubber elastic body is anchored to a radially inner surface of the tubular part and includes a sealing rubber. The partition includes a press-sealing face positioned at an outer peripheral edge of an axial end face thereof, and is pressed against an axial end face of the sealing rubber at the press-sealing face. A seal rib protruding axially outward from the press-sealing face of the partition is more strongly pressed against the axial end face of the sealing rubber such that a fluid-tight sealing is provided axially between the sealing rubber and the partition.

4 Claims, 9 Drawing Sheets

(52) U.S. Cl.
CPC ..... *F16F 2224/025* (2013.01); *F16F 2230/30* (2013.01)

(56) References Cited

U.S. PATENT DOCUMENTS

| | | | | |
|---|---|---|---|---|
| 6,435,487 | B1* | 8/2002 | Takaoka | F16F 13/107 267/140.11 |
| 2001/0019099 | A1* | 9/2001 | Okanaka | F16F 13/105 248/562 |
| 2008/0053645 | A1 | 3/2008 | Hakamata et al. | |
| 2012/0242021 | A1* | 9/2012 | Koyama | F16F 13/103 267/140.14 |
| 2015/0252866 | A1* | 9/2015 | Muraoka | F16F 13/085 267/140.13 |
| 2016/0369864 | A1* | 12/2016 | Kubota | B60K 5/1208 |
| 2018/0023655 | A1* | 1/2018 | Komiya | F16F 13/10 267/140.13 |
| 2018/0066727 | A1* | 3/2018 | Mathai | B60K 5/1208 |
| 2019/0168595 | A1* | 6/2019 | Tanaka | B60K 5/1208 |

FOREIGN PATENT DOCUMENTS

| | | |
|---|---|---|
| JP | 2011-85194 A | 4/2011 |
| JP | 2012-97849 A | 5/2012 |
| JP | 5572524 B2 | 8/2014 |
| JP | 2015-36578 A | 2/2015 |
| WO | 2017/033522 A1 | 3/2017 |

OTHER PUBLICATIONS

Jun. 19, 2018 International Search Report issued in International Patent Application No. PCT/JP2018/010983.
Mar. 20, 2020 Office Action issued in Chinese Patent Application No. 201880003548.8.

* cited by examiner

FLUID-FILLED VIBRATION DAMPING DEVICE

INCORPORATED BY REFERENCE

This application is a Continuation of International. Application No. PCT/JP2018/010983 filed Mar. 20, 2018, which claims priority under 35 U.S.C. §§ 119(a) and 365 of Japanese Patent Application No. 2017-133927 filed on Jul. 7, 2017, the disclosures of which are expressly incorporated herein by reference in their entireties.

BACKGROUND OF THE INVENTION

1Field of the Invention

The present invention relates generally to a vibration damping device used for an automotive engine mount and the like, and more particularly to a fluid-filled vibration damping device utilizing a vibration damping Elect based on flow action of a fluid filling the interior and the like.

2. Description of the Related Art

Conventionally, vibration damping devices used for automotive engine mounts and the like are known. As disclosed in, for example, Japanese Unexamined Patent Publication No. JP-A-2011-085194, the vibration damping device includes an inner tube member and an outer tube member respectively attached to one and the other of components that make up a vibration transmission system such as a power unit and a vehicle body, and a main rubber elastically connecting the two members to each other.

Also, for the purpose of improving vibration damping ability with respect to a specific vibration or the like, a fluid-filled vibration damping device utilizing a vibration damping effect based on a resonance action or the like of a fluid filling the interior is also proposed as one type of the vibration damping device from the past. As shown in JP-A-2011-085194, the fluid-filled vibration damping device has a structure in which a primary liquid chamber and an auxiliary liquid chamber filled with a non-compressible fluid are respectively formed on one and the other sides of a partition disposed on the radially inner side of the outer tube member, and a restricting passage through which the primary liquid chamber and the auxiliary liquid chamber communicate with each other is formed in the partition.

Meanwhile, in the fluid-filled vibration damping device, in order to effectively obtain the desired vibration damping ability, it is necessary that the primary liquid chamber and the auxiliary liquid chamber be defined in a fluid-tight manner without short-circuiting other than via the restricting passage. Therefore, in JP-A-2011-085194, a portion of the main rubber is clasped axially between the outer tube member and the partition as a seal rubber so that a fluid-tight sealing is provided axially between the superposed faces of the outer tube member and the partition, thereby defining the primary liquid chamber in a fluid-tight manner. In addition, an elastic seal rib protrudes from the seal rubber, and by the elastic seal rib being pressed against the partition, the sealing performance may be improved.

However, in the structure described in JP-A-2011-085194, the seal rib for improving the sealing performance is integrally formed with the main rubber, and is configured to elastically deform in a falling-down manner. Accordingly, when a high sealing performance is required or the like, a contact pressure of the elastic seal rib with respect to the partition cannot be sufficiently obtained in some cases, making it difficult to realize the required sealing performance.

Moreover, even in the structure of JP-A-2011-085194, there is also a risk that variability May occur in the mode of deformation of the elastic seal rib pressed against the partition, and it is difficult to stably obtain the desired sealing performance.

SUMMARY OF THE INVENTION

It is therefore one object of this invention to provide a fluid-filled vibration damping device of novel structure which is able to reliably provide fluidtightness between the main rubber elastic body and the partition that are pressed against each other in the axial direction.

The above and/or optional objects of this invention may be attained according to at least one of the following preferred embodiments of the invention. The following preferred embodiments and/or elements employed in each preferred embodiment of the invention may be adopted at any possible optional combinations.

A first preferred embodiment of the present invention provides a fluid-filled vibration damping device comprising: an inner member; an outer member including a tubular part; a main rubber elastic body elastically connecting the inner member and the outer member to each other; a partition disposed on a radially inner side of the tubular part of the outer member; a primary liquid chamber and an auxiliary liquid chamber formed on opposite sides of the partition, the primary liquid chamber and the auxiliary liquid chamber being filled with a non-compressible fluid; and an orifice passage through which the primary liquid chamber and the auxiliary liquid chamber communicate with each other, the orifice passage being formed in the partition, wherein an axial end portion of the main rubber elastic body is anchored to an radially inner surface of the tubular part of the outer member, the axial end portion of the main rubber elastic body includes a sealing rubber, the partition disposed on the radially inner side of the tubular part of the outer member includes a press-sealing face positioned at an outer peripheral edge of an axial end face thereof, and is pressed against an axial end face of the sealing rubber at the press-sealing face, and a seal rib protruding axially outward from the press-sealing face of the partition is more strongly pressed against the axial end face of the sealing rubber such that a fluid-tight sealing is provided axially between the sealing rubber and the partition.

According to the fluid-filled vibration damping device structured following the first preferred embodiment, the press-sealing face positioned at the outer peripheral edge of the axial end face of the partition is pressed against the sealing rubber provided to the axial end portion of the main rubber elastic body, so that an effective sealing is provided between the sealing rubber of the main rubber elastic body and the partition.

Moreover, the partition is provided with the seal rib protruding axially outward from the press-sealing face, and the seal rib is more strongly pressed against the axial end face of the sealing rubber than the portion of the press-sealing face which is away from the seal rib. Thus, a fluid-tight sealing is provided between the sealing rubber of the main rubber elastic body and the partition with higher reliability.

Furthermore, since the seal rib is provided on the rigid partition side, in comparison with the case where the rib is provided on the sealing rubber side, falling down or collapse of the rib due to the pressing does not occur, so that a better sealing performance can be stably obtained.

A second preferred embodiment of the present invention provides the fluid-filled vibration damping device according to the first preferred embodiment, wherein the partition is formed of a material having a smaller specific gravity than that of iron.

According to the second preferred embodiment, by adopting a lightweight material such as an aluminum alloy or a synthetic resin having a smaller specific gravity than that of iron as a forming material of the partition, further weight reduction of the fluid-filled vibration damping device may be achieved.

A third preferred embodiment of the present invention provides the fluid-filled vibration damping device according to the first or second preferred embodiment, wherein the outer member includes a stepped face on the radially inner surface of the tubular part, the radially inner surface of the tubular part on a first axial side of the stepped face comprises a rubber anchoring face to which an outer peripheral surface of the axial end portion of the main rubber elastic body is anchored, while the radially inner surface of the tubular part on a second axial side of the stepped face comprises a partition mounting face in which the partition is arranged in an inserted state, the axial end portion of the main rubber elastic body is anchored to the rubber anchoring face and the stepped face, and the sealing rubber of the main rubber elastic body protrudes further inward than the stepped face.

According to the third preferred embodiment, the stepped face is provided to the radially inner surface of the tubular part of the outer member, and the outer peripheral surface of the axial end portion of the main rubber elastic body is anchored to the large-diameter rubber anchoring face of the tubular part, while the axial end face of the axial end portion of the main rubber elastic body is anchored to the stepped face of the tubular part. By so doing, a large anchoring area of the main rubber elastic body to the outer member is obtained, so that even if a shearing force or a tensile force acts on the anchoring portion of the axial end portion of the main rubber elastic body and the tubular part of the outer member by pressing the partition against the sealing rubber of the main rubber elastic body in the axial direction, peeling of the main rubber elastic body from the outer member or the like may be prevented. Therefore, it is possible to strongly press the press-sealing face of the partition against the sealing rubber of the main rubber elastic body, thereby further enhancing the sealing performance between the axial end portion of the main rubber elastic body and the partition as well.

In this way, in the case where the stepped face is formed in the tubular part of the outer member and the axial end portion of the main rubber elastic body extends further to the radially outer side of the sealing rubber, when the press-sealing face of the partition is pressed against the sealing rubber, the sealing rubber is likely to escape to the radially outer side. However, by the seal rib provided on the press-sealing face being preferentially pressed against the sealing rubber, escape of the sealing rubber to the radially outer side is prevented, thereby obtaining excellent sealing performance.

A fourth preferred embodiment of the present invention provides the fluid-filled vibration damping device according to any one of the first to third preferred embodiments, wherein the outer member includes an inner flange-shaped part protruding inward from the tubular part, and at least a portion of the press-sealing face of the partition is disposed in opposition to the inner flange-shaped part in an axial direction, the sealing rubber of the main rubber elastic body is anchored to a face of the inner flange-shaped part opposed to the press-sealing face such that the sealing rubber is arranged axially between the press-sealing face and the inner flange-shaped part, and the seal rib of the partition is formed on a portion of the press-sealing face opposed to the inner flange-shaped part.

According to the fourth preferred embodiment, by the press-sealing face of the partition being pressed against the sealing rubber of the main rubber elastic body, the sealing rubber of the main rubber elastic body is compressed in the axial direction between the inner flange-shaped part of the outer member and the press-sealing face of the partition. Therefore, it is possible to improve the sealing performance by pressing the press-sealing face more strongly against the sealing rubber, and also to prevent peeling of the main rubber elastic body from the outer member due to the pressing of the press-sealing face, or the like.

Besides, since the sealing rubber is compressed in the axial direction between the seal rib and the inner flange-shaped part at the portion where the seal rib is pressed, it is possible to further improve the sealing performance by pressing the seal rib more strongly against the sealing rubber, and also to prevent peeling of the main rubber elastic body from the outer member due to the strong pressing of the seal rib, or the like.

Furthermore, for example, if the seal rib is provided in the widthwise middle portion of the press-sealing face, the seal rib limits inward deformation of the sealing rubber positioned on the radially outer side of the abutment portion of the seal rib. This may more advantageously realize the sealing due to the abutment between the press-sealing face and the sealing rubber on the radially outer side of the seal rib.

According to the present invention, the press-sealing face positioned at the outer peripheral edge of the axial end face of the partition is pressed against the sealing rubber provided to the axial end portion of the main rubber elastic body, so that an effective sealing is provided between the sealing rubber of the main rubber elastic body and the partition. Furthermore, since the seal rib protruding axially outward from the press-sealing face of the partition is more strongly pressed against the end face of the sealing rubber, a fluid-tight sealing is provided between the sealing rubber of the main rubber elastic body and the partition with higher reliability. Furthermore, since the seal rib is provided on the rigid partition side, in comparison with the case where the rib is provided on the sealing rubber side, falling down or collapse of the rib due to the pressing does not occur, so that a better sealing performance can be stably obtained.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein.

DETAILED DESCRIPTION OF EMBODIMENTS

Practical embodiments of the present invention will be described below in reference to the drawings.

FIGS. 1 to 6 show an automotive engine mount 10 as a first practical embodiment of a fluid-filled vibration damping device having a structure according to the present invention. The engine mount 10 has a structure in which an inner member 12 and an outer member 14 are elastically connected to each other by a main rubber elastic body 16. In the following description, as a general rule, the vertical direction refers to the vertical direction in FIG. 1, which is the axial direction of the engine mount 10, the lateral direction refers to the lateral direction in FIG. 1, and the front-back direction refers to the lateral direction in FIG. 2.

Figure 1:
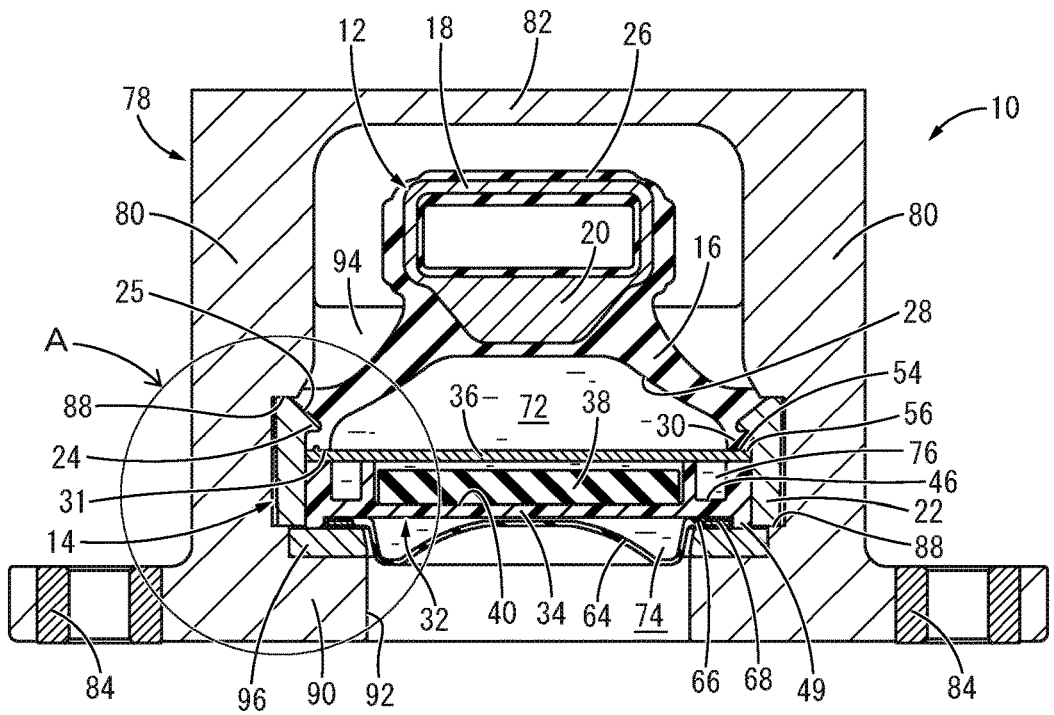
FIG. 1 is a cross-sectional view showing a fluid-filled vibration damping device in the form of an engine mount according to a first practical embodiment of the present invention, taken along line 1-1 of FIG. 4.
Figure 2:
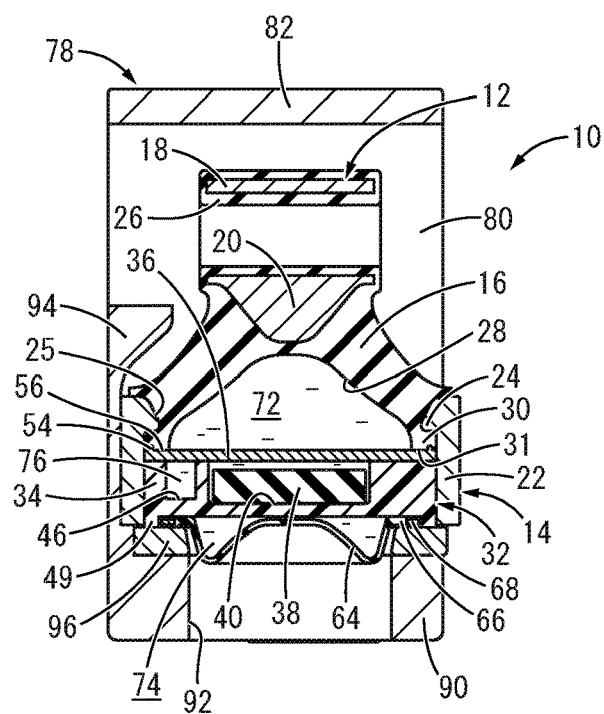
FIG. 2 is a cross-sectional view of the engine mount shown in FIG. 1, taken along line 2-2 of FIG, 3.
Figure 7:
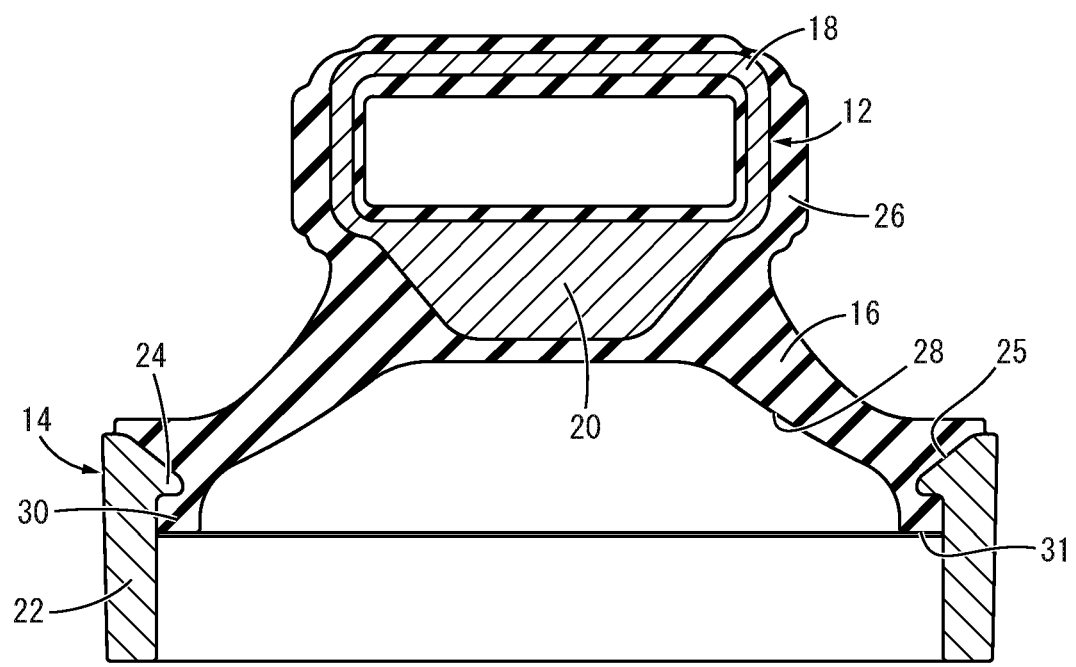
FIG. 7 is a cross-sectional view showing an integrally vulcanization molded component of a main rubber elastic body constituting the engine mount of FIG. 1.

Described more specifically, as shown in FIGS. 1, 2, and 7, the inner member 12 is provided with a -roughly quadrangular tube-shaped fitting tube 18 extending in the front-back direction. The fitting tube 18 integrally includes, at its center portion of the lower wall, an anchoring part 20 having an approximate shape of inverted frustum of a cone whose cross-sectional area becomes gradually smaller downward, and protruding downward. The inner member 12 may preferably be formed of a lightweight material such as aluminum alloy or synthetic resin.

As shown in FIGS. 1, 2, 7, 8, and the like, the outer member 14 is a high rigidity component made of metal, synthetic resin, or the like, and is provided with a thick-walled, large-diameter tubular part 22 having a roughly quadrangular tube shape, and an inner flange-shaped part 24 protruding inward from the upper end of the tubular part 22. Besides, the upper end surface of the outer member 14 includes an inclined surface 25 that is gradually inclined downward toward the radially inner side.

The tubular part 22 includes a radially inner surface having a roughly quadrangular tube shape, and is curved in an arcuate shape at the corners, so as to have a shape that continues smoothly without a break point or a broken line in the circumferential direction. Further, with the tubular part 22 of the present practical embodiment, the outer peripheral surface has a roughly quadrangular tube shape that corresponds to the radially inner surface, and the outer surfaces on laterally both sides are inclined inward so as to approach each other downward.

The inner flange-shaped part 24 is integrally formed with the upper end of the tubular part 22 and protrudes toward the radially inner side. The vertical dimension of the inner flange-shaped part 24 gradually decreases toward the protruding distal end side by being configured such that the upper surface thereof has an inclined shape and the lower surface thereof spreads in the roughly axis-perpendicular direction.

Then, the inner member 12 and the outer member 14 are disposed roughly coaxially in the vertical direction, and the main rubber elastic body 16 is provided between the inner member 12 and the outer member 14. The main rubber elastic body 16 has an approximate shape of frustum of a quadrangular pyramid overall. As shown in FIGS. 1 and 2, the anchoring part 20 of the inner member 12 is bonded by vulcanization to the upper portion of the main rubber elastic body 16, while the upper portion of the outer member 14 is bonded by vulcanization to the lower portion of the main rubber elastic body 16. Furthermore, the fitting tube 18 of the inner member 12 is roughly entirely covered with a covering rubber layer 26 which is integrally formed with the main rubber elastic body 16. The main rubber elastic body 16 of the present practical embodiment takes the form of an integrally vulcanization molded component incorporating the inner member 12 and the outer member 14.

Besides, a large-diameter recess 28 opening downward is formed in the lower portion of the main rubber elastic body 16. The lower end portion of the main rubber elastic body 16 constituting the peripheral wall in the vicinity of the opening of the large-diameter recess 28 serves as a sealing rubber 30 having a roughly quadrangular tube shape.

With the sealing rubber 30, four corners are each curved in an arcuate shape. The curvature radius of the radially inner surface of each corner is larger than the curvature radius of the outer peripheral surface thereof, while the width dimension in the axis-perpendicular direction of each corner is larger than the width dimension in the axis-perpendicular direction of each side. The sealing rubber 30 is anchored to the radially inner surface of the outer member 14 in a superposed state. In the present practical embodiment, the sealing rubber 30 is disposed below the inner flange-shaped part 24 of the outer member 14, and the sealing rubber 30 is anchored to the radially inner surface of the tubular part 22 and the lower surface of the inner flange-shaped part 24.

At the lower end of the main rubber elastic body 16, the lower end surface of the sealing rubber 30 comprises a seal abutment surface 31 spreading in the axis-perpendicular direction. The seal abutment surface 31 is provided so as to be remote downwardly in the axial direction from the surface of the main rubber elastic body 16 anchored to the upper end surface of the outer member 14 by the axial length of the sealing rubber 30 anchored to the radially inner surface of the outer member 14.

In addition, a partition 32 is attached to the outer member 14. As shown in FIGS, 9 to 12, the partition 32 has a thick, roughly quadrangular plate shape overall, and in the present practical embodiment, has a structure in which a lid member 36 is attached to a partition main body 34, and a movable member 38 is disposed between the partition main body 34 and the lid member 36.

Figure 9:
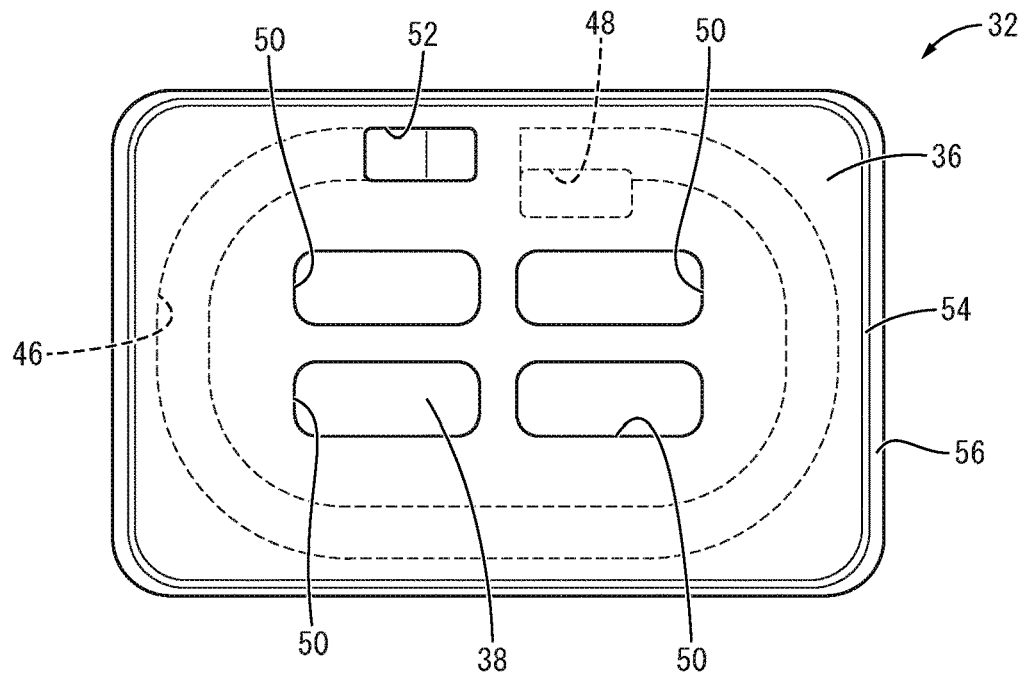
FIG. 9 is an enlarged top plan view showing a partition constituting the engine mount of FIG. 1.
Figure 10:
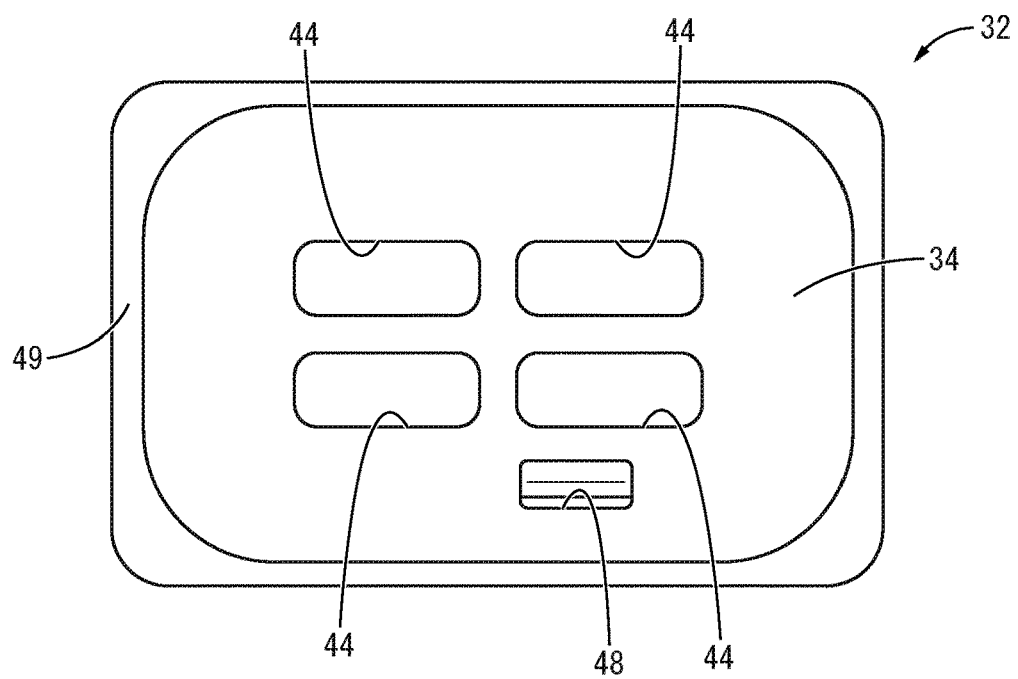
FIG. 10 is a bottom plan view of the partition shown in FIG. 9.
Figure 11:
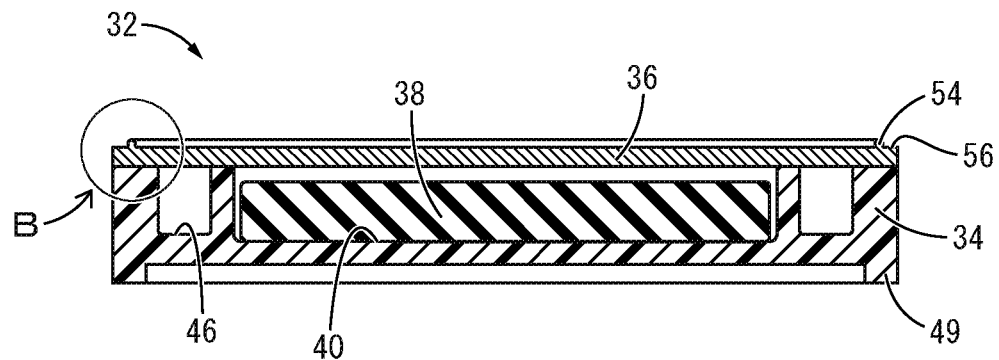
FIG. 11 is a cross-sectional view of the partition shown in FIG. 9.

The partition main body 34 has a thick, roughly quadrangular plate shape, and is a rigid component made of metal, synthetic resin, or the like. Besides, there is formed a housing recess 40 in the radially inner portion of the partition main body 34 so as to open onto the upper surface, and as shown in FIG. 10, there are formed lower through holes 44 penetrating the bottom wall of the housing recess 40 in the vertical direction. Furthermore, as shown in FIGS. 9 and 11, in the outer peripheral portion of the partition main body 34, there is formed a circumferential groove 46 extending in the circumferential direction for a length just short of once around the circumference while opening onto the upper surface, and there is formed a lower communication hole 48 so as to penetrate either one of the lengthwise ends of the circumferential groove 46. At the outer peripheral end of the partition main body 34, a positioning protrusion 49 protruding downward is integrally formed continuously about the entire circumference. It is desirable that the partition main body 34 be formed of a lightweight material having a smaller specific gravity than that of iron, and for example, by adopting aluminum alloy, synthetic resin or the like as a forming material, the weight of the engine mount 10 may be reduced.

As shown in FIGS. 9 and 11, the lid member 36 has a thin, roughly quadrangular plate shape and has substantially the same profile as that of the partition main body 34 viewed in the axial direction. Besides, the lid member 36 includes upper through holes 50 penetrating its radially inner portion in the vertical direction, and an upper communication hole 52 penetrating its outer peripheral portion in the vertical direction at a portion in the circumferential direction.

Figure 12:
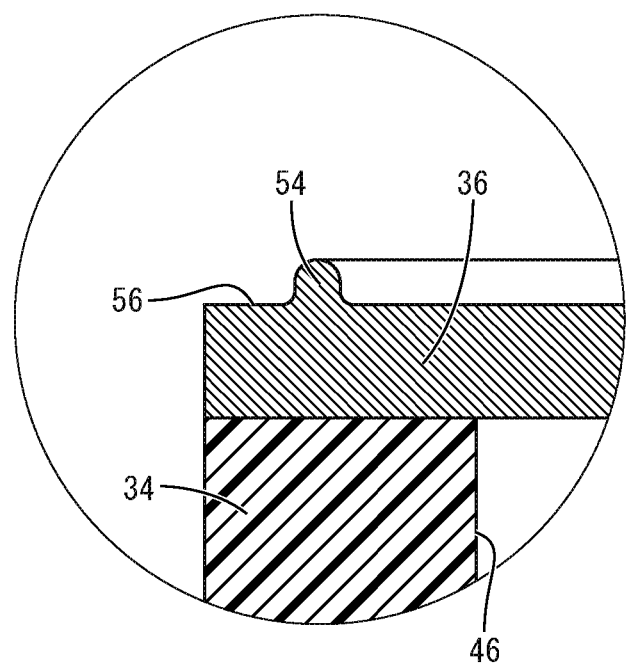
FIG. 12 is an enlarged cross-sectional view of B in FIG. 11.

Moreover, on the outer peripheral portion of the lid member 36, there is formed a seal rib 54. As shown in FIGS. 9, 11, and 12, the seal rib 54 protrudes upward from the upper surface of the lid member 36 and extends continuously about the entire circumference in the circumferential direction with a roughly semicircular cross section. Although the cross-sectional shape of the seal rib 54 can be appropriately changed, since the seal rib 54 is pressed against the sealing rubber 30 of the main rubber elastic body 16 as described later, it is desirable that at least the portion abutting against the sealing rubber 30 have a smooth surface without an edge. The outer peripheral portion of the upper surface of the lid member 36 comprises a press-sealing face 56 which is pressed against the sealing rubber 30. In the present practical embodiment, the seal rib 54 protrudes axially upward in the radially middle portion of the press-sealing face 56.

The lid member 36 is fixed to the partition main body 34 in a superposed state on the upper surface of the partition main body 34. A method of fixing the partition main body 34 and the lid member 36 is not particularly limited. For example, the partition main body 34 and the lid member 36 may be fastened by clinching with a clinching pin protruding from the partition main body 34. Alternatively, the superposed faces of the partition main body 34 and the lid member 36 may be adhered. to each other. However, fixing of the partition min body 34 and the lid member 36 is not essential in the present invention.

With the lid member 36 superposed on the upper surface of the partition main body 34, the seal rib 54 of the lid member 36 is provided so as to be positioned on the axially upper side of the positioning protrusion 49 of the partition main body 34, and is provided at a position outwardly away from the abutting portion of a supported piece 66 of a flexible film 64 which will be described later.

The opening of the housing recess 40 of the partition main body 34 is covered with the lid member 36, and the movable member 38 housed in the housing recess 40 of the partition main body 34 is arranged between the partition main body 34 and the lid member 36. As shown in FIGS. 1, 2, and 11, the movable member 38 of the present practical embodiment is a rubber elastic body having a generally circular disk shape overall, and is vertically displaceable within the housing recess 40 between the partition main body 34 and the lid member 36.

As shown in FIGS. 1 and 2, the partition 32 having such a structure is inserted from below into the tubular part 22 of the outer member 14, and is disposed on the radially inner side of the tubular part 22.

Furthermore, the press-sealing face 56 provided at the outer peripheral end of the partition 32 is pressed against the sealing rubber 30 from below in the axial direction, and at least the outer peripheral end thereof overlaps with the inner flange-shaped part 24 of the outer member 14 as viewed in the axial direction, and is disposed in opposition to the inner flange-shaped part 24 in the axial direction so as to be remote downwardly. With this configuration, the sealing rubber 30 anchored to the lower surface of the inner flange-shaped part 24 is disposed between the axially opposed faces of the inner flange-shaped part 24 of the outer member 14 and the press-sealing face 56 of the partition 32. Both the lower surface of the sealing rubber 30 and the press-sealing face 56 spread in the roughly axis-perpendicular direction and are substantially parallel to each other. Moreover, the lower surface of the radially middle portion of the inner flange-shaped part 24 also spreads in the roughly axis-perpendicular direction.

Moreover, the seal rib 54 protruding from the press-sealing face 56 is disposed at a position inwardly remote from the radially inner surface of the tubular part 22, and is disposed at a position overlapping with the inner flange-shaped part 24 as viewed in the axial direction. In the present practical embodiment, on the press-sealing face 56 of the partition 32, the seal rib 54 is located on the radially inner side of the radial center of the portion overlapping with the inner flange-shaped part 24 as viewed in the axial direction.

Figure 13:
FIG. 13 is an enlarged cross-sectional view showing a flexible film constituting the engine mount of FIG. 1, taken along line 13-13 of FIG. 14.
Figure 14:
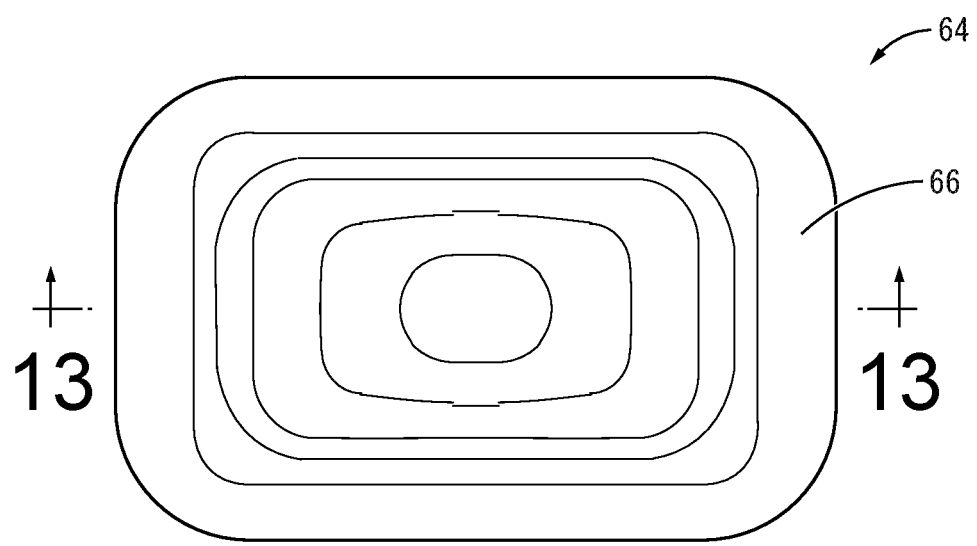
FIG. 14 is a top plan view of the flexible film shown in FIG. 13.

In addition, a flexible film 64 is disposed below the partition 32. As shown in FIGS. 13 and 14, this flexible film 64 is a deformable thin rubber film, and with a slack in the vertical direction, the flexible film 64 is more easily deformable in the vertical direction. Besides, a supported piece 66 of annular plate shape is integrally formed with the outer peripheral end of the flexible film 64 so as to spread in the roughly axis-perpendicular direction, and a fastener fitting 68 of generally ring plate shape is anchored to the supported piece 66.

Figure 8:
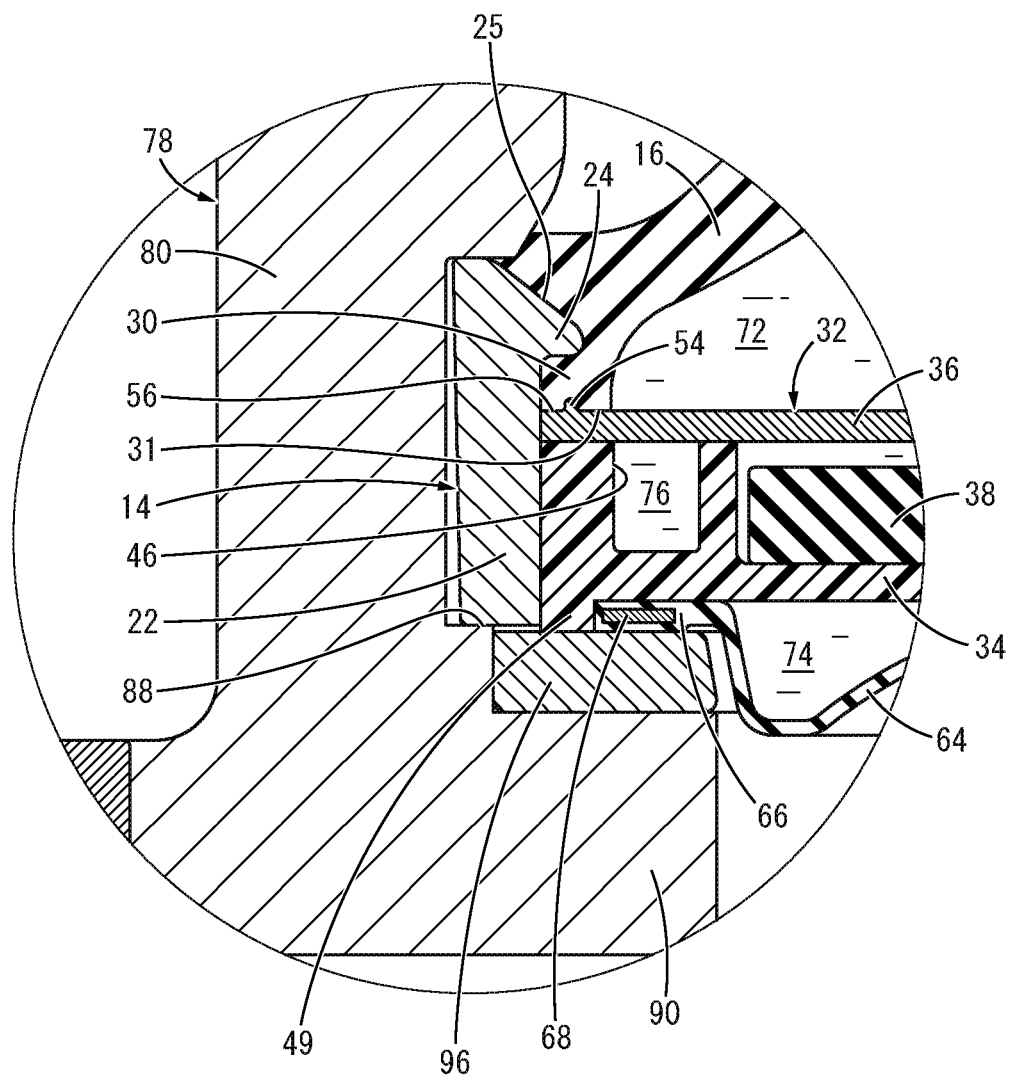
FIG. 8 is an enlarged cross-sectional view of A in FIG. 1.

As shown in FIGS. 1, 2, and 8, the supported piece 66 provided with the fastener fitting 68 is overlapped with the partition 32 from below, and the supported piece 66 is inserted into the radial inside of the positioning protrusion 49 of the partition main body 34, so that the flexible film 64 is positioned with respect to the partition 32 in the axis-perpendicular direction. The flexible film 64 is fluid-tightly attached to the partition 32 by mounting an outer bracket 78 described later.

By the flexible film 64 being attached to the partition 32 in this way, a pressure-receiving chamber 72 serving as a primary liquid chamber which gives rise to internal pressure fluctuations at the time of vibration input is provided between the main rubber elastic body 16 and the partition 32, while an equilibrium chamber 74 serving as an auxiliary liquid chamber that readily permits changes in volume due to deformation of the flexible film 64 is formed between the partition 32 and the flexible film 64. The pressure-receiving chamber 72 and the equilibrium chamber 74 are arranged on axially opposite sides of the partition 32, and are filled with a non-compressible fluid. The non-compressible fluid sealed therein is not limited to a particular fluid, For example, preferably adopted as the fluid is a liquid such as water, ethylene glycol, alkylene glycol, polyalkylene glycol, silicone oil, or a mixture liquid of them. Moreover, it is desirable for the non-compressible fluid to be a low-viscosity fluid having viscosity of 0.1 Pa·s or lower.

As shown in FIGS. 1 and 2, the circumferential groove 46 of the partition main body 34 is tunnel-Shaped with the upper opening covered with the lid member 36, and one end of the circumferential groove 46 communicate with the pressure-receiving chamber 72 via the upper communication hole 52 penetrating the lid member 36, while the other end thereof communicates with the equilibrium chamber 74 via the lower communication hole 48 penetrating the partition main body 34. Accordingly, an orifice passage 76 through which the pressure-receiving chamber 72 and the equilibrium chamber 74 communicate with each other is constituted by the circumferential groove 46 formed in the partition 32. With respect to the orifice passage 76 of the present practical embodiment, the tuning frequency, which is the resonance frequency of the flowing fluid, is set to a low frequency on the order of 10 Hz corresponding to engine shake, by adjusting the ratio of the passage cross sectional area to the passage length.

The housing recess 40 of the partition 32 communicates with the pressure-receiving chamber 72 via the upper through holes 50 and communicates with the equilibrium chamber 74 via the lower through holes 44. Accordingly, the internal pressure of the pressure-receiving chamber 72 is exerted on one face of the movable member 38 and the internal pressure of the equilibrium chamber 74 is exerted on the other face of the movable member 38 disposed in the housing recess 40. When a small-amplitude vibration having a frequency higher than the tuning frequency of the orifice passage 76 is input, the movable member 38 is displaced in the vertical direction, so as to permit the substantial fluid flow between the pressure-receiving chamber 72 and the equilibrium chamber 74.

Incidentally, the pressure-receiving chamber 72 and the equilibrium chamber 74 are fluid-tightly defined by the outer bracket 78 being mounted onto the outer member 14. The outer bracket 78 is a high rigidity component made of metal, synthetic resin or the like, and as shown in FIG. 1, integrally includes left and right mounting legs 80, 80 extending vertically and a top plate 82 integrally connecting the upper ends of the left and right mounting legs 80, 80.

As shown in FIGS. 1 to 4, the left and right mounting legs 80, 80 have a plate shape having a predetermined width dimension in the front-back direction, and are arranged in opposition to each other in the lateral direction. The lower ends of the mounting legs 80, 80 have a plate shape extending laterally outward, and respective mounting nuts 84 are fixed to the lower ends of the left and right mounting legs 80, 80.

As shown in FIG, 1, the left and right mounting legs 80, 80 of the outer bracket 78 each have a connecting groove 88 which extends in the front-back direction while opening inward in the direction of opposition. The cross-sectional shapes of the connecting grooves 88 substantially correspond to the laterally outer end portions of the outer member 14. The groove width dimension (vertical inside dimension) of the connecting groove 88 is substantially equal to the vertical dimension of the laterally outer end portions of the outer member 14.

As shown in FIGS. 1 to 5, the top plate 82 has a plate shape extending in the lateral direction, and is integrally formed with the mounting legs 80, 80. Both the left and right ends of the top plate 82 are continuous with the upper ends of the mounting legs 80, 80.

Figure 6:
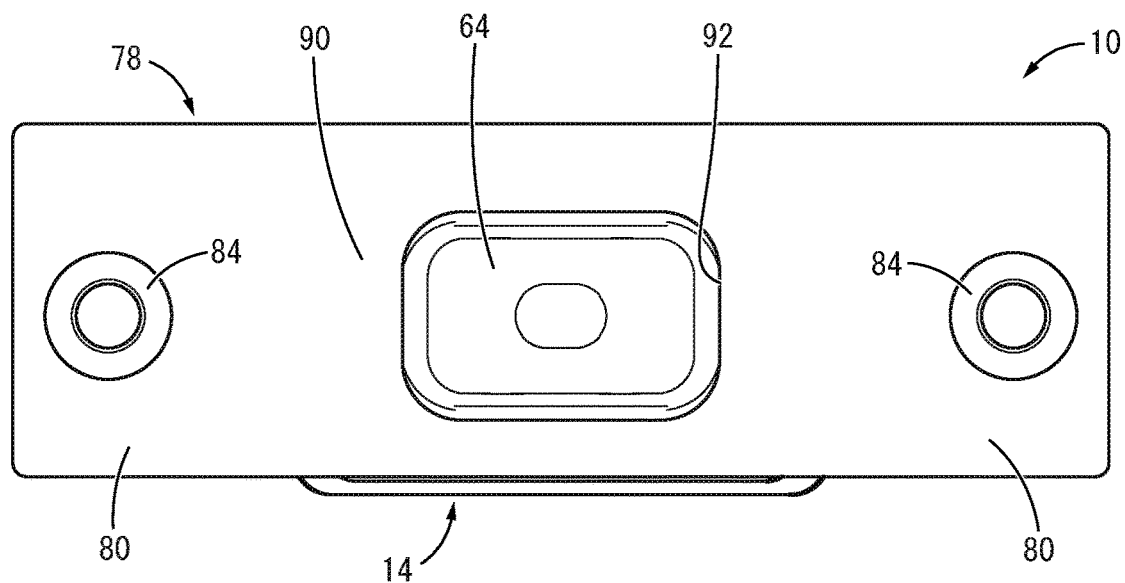
FIG. 6 is a bottom plan view of the engine mount shown in FIG. 1.

A bottom plate 90 is integrally formed with the lower portions of the left and right mounting legs 80, 80 so as to straddle the left and right mounting legs 80, 80. As shown in FIG. 6, the bottom plate 90 has a plate shape extending in the lateral direction and is arranged in opposition to the top plate 82 in the vertical direction, and is integrally connected to the lower portions of the left and right mounting legs 80, 80. Further, the bottom plate 90 is vertically penetrated by a window 92 that permits deformation of the flexible film 64. It should be noted that the bottom plate 90 is provided below the connecting grooves 88.

Figure 3:
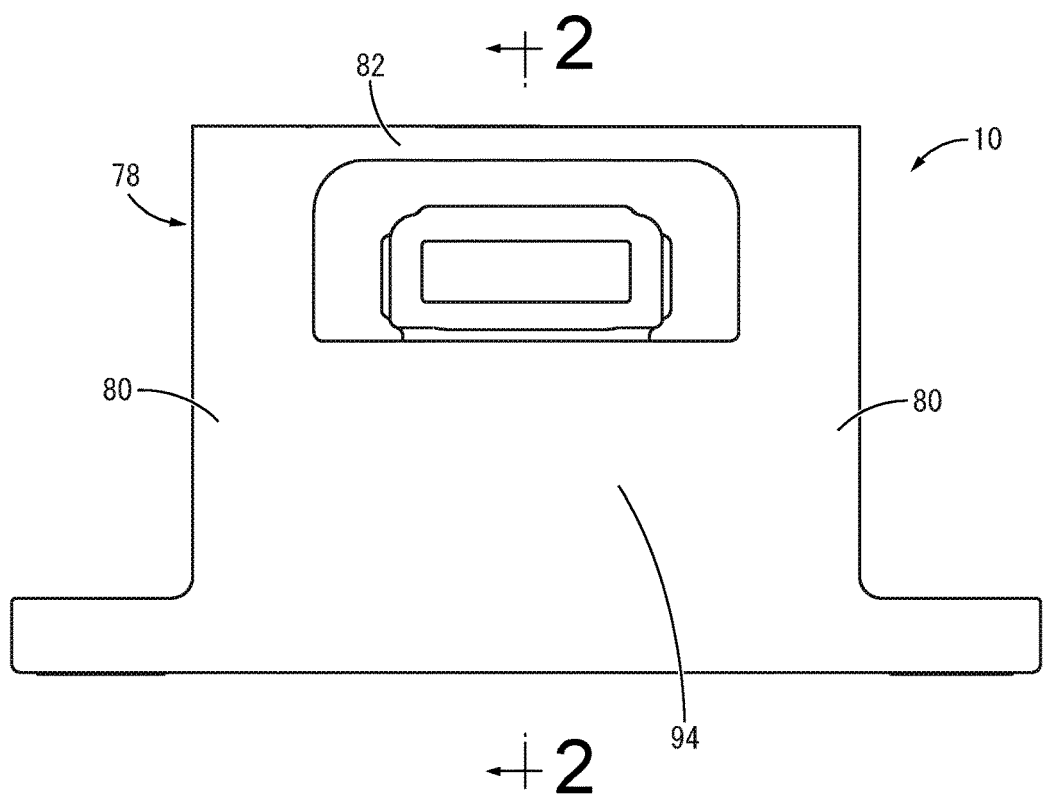
FIG. 3 is a front view of the engine mount shown in FIG. 1.
Figure 4:
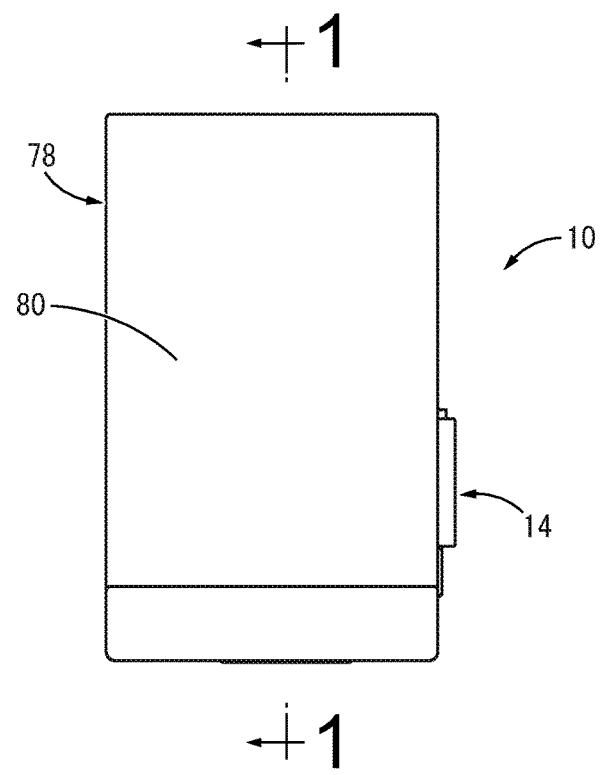
FIG. 4 is a side view of the engine mount shown in FIG. 1.
Figure 5:
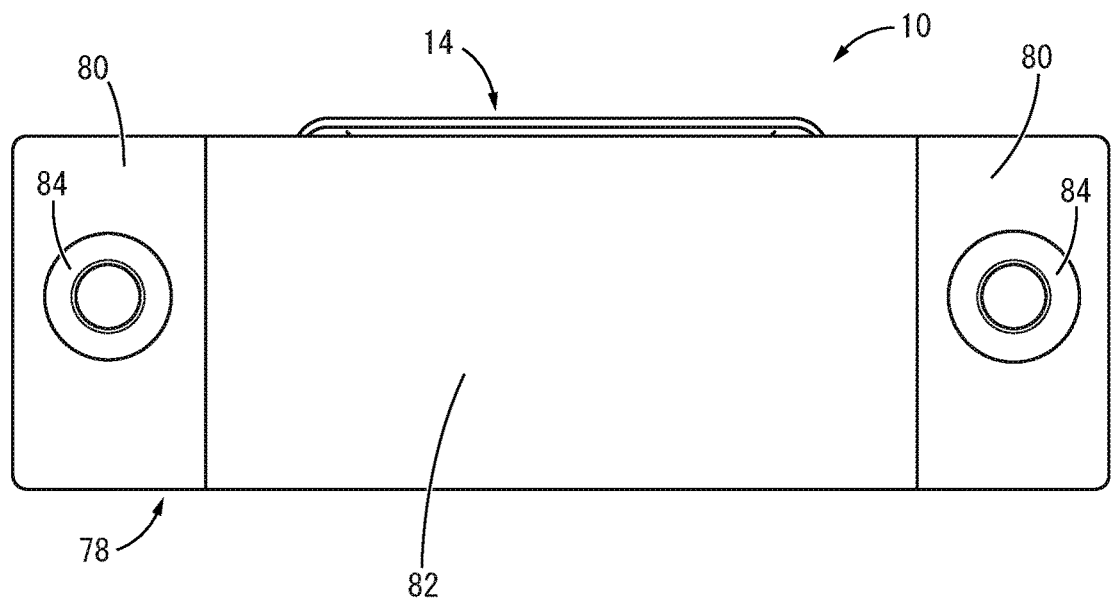
FIG. 5 is a top plan view of the engine mount shown in FIG. 1.

As shown in FIGS. 1 to 3, a front wall 94 is integrally formed with the front ends of the left and right mounting legs 80, 80. The front wall 94 has a plate shape extending in the lateral direction, and is spaced apart downward from the top plate 82. Both the left and right ends of the front wall 94 are connected to the respective mounting legs 80, 80, while the lower end thereof is connected to the bottom plate 90. The front ends of the connecting grooves 88 formed in the left and right mounting legs 80, 80 are closed by the front wall 94.

The outer bracket 78 having such a structure is mounted onto the outer member 14. That is, the mount main body, in which the partition 32 and the flexible film 64 are attached to the integrally vulcanization molded component of the main rubber elastic body 16 including the outer member 14, is horizontally inserted from the back into the region surrounded by the left and right mounting legs 80, 80, the top plate 82, and the bottom plate 90 of the outer bracket 78. As shown in FIGS. 1 and 8, the outer member 14 is inserted into the connecting grooves 88, 88 of the outer bracket 78, so that the outer bracket 78 is mounted onto the outer member 14.

There is formed a gap between the portions of the outer peripheral surface of the outer member 14 positioned on laterally both sides and the groove bottom faces of the connecting grooves 88, 88 of the outer bracket 78. This gap reduces the resistance during insertion due to interference or friction between the outer member 14 and the outer bracket 78, so that the fastening force in the axial direction of the outer member 14 and the outer bracket 78 will be efficiently obtained.

With the outer bracket 78 attached to the outer member 14, between the partition 32 and the supported piece 66 of the flexible film 64 on one side and the bottom plate 90 of the outer bracket 78 on the other side, a pressing member 96 having a roughly quadrangular ring shape is disposed. The pressing member 96 has a thickness that is smaller than a vertical deviation (step) between the groove inside face on the lower side of the connecting grooves 88, 88 and the upper surface of the bottom plate 90 of the outer bracket 78. Accordingly, it is possible to individually set the force of the connecting grooves 88, 88 in the axial direction for clamping the outer member 14, and the seal abutting force between the seal abutment surface 31 of the sealing rubber 30 on one side and the press-sealing face 56 and the seal rib 54 of the lid member 36 on the other side which is exerted by the bottom plate 90 of the outer bracket 78 being pressed against the partition 32 via the pressing member 96 in a more stable manner.

The partition 32, the supported piece 66 of the flexible film 64, and the pressing member 96 are vertically clamped between the sealing rubber 30 of the main rubber elastic body 16 and the bottom plate 90 of the outer bracket 78. By so doing, the press-sealing face 56 of the partition 32 is pressed against the sealing rubber 30 of the main rubber elastic body 16 from below, so as to provide a fluid-tight sealing between the sealing rubber 30 and the press-sealing face 56. Meanwhile, the supported piece 66 of the flexible film 64 is pressed against the lower surface of the partition 32, so as to provide a fluid-tight sealing between the partition 32 and the flexible film 64. With these configurations, the walls of the pressure-receiving chamber 72 and the equilibrium chamber 74 are fluid-tightly constituted, and the pressure-receiving chamber 72 and the equilibrium chamber 74 are fluid-tightly defined with respect to the external space, while short circuit between the pressure-receiving chamber 72 and the equilibrium chamber 74 is prevented.

Moreover, the seal rib 54 protruding upward is formed about the entire circumference on the press-sealing face 56 of the partition 32, and the seal rib 54 is more strongly pressed against the lower surface of the sealing rubber 30 of the main rubber elastic body 16. Accordingly, more effective sealing is provided between the main rubber elastic body 16 and the partition 32 at the abutting portion between the sealing rubber 30 of the main rubber elastic body 16 and the seal rib 54 of the partition 32.

In the present practical embodiment, as shown in FIG. 7, the lower surface of the sealing rubber 30 is a plane spreading in the axis-perpendicular direction across roughly its entirety including the portion abutted by the seal rib 54. Thus, by the press-sealing face 56 being pressed against the sealing rubber 30, the seal rib 54 can be more strongly pressed against the sealing rubber 30.

Furthermore, in the present practical embodiment, the seal rib 54 of the lid member 36 is disposed on the upper side of the positioning protrusion 49 of the partition main body 34, and the portion of the supported piece 66 of the flexible film 64 clamped by the partition 32 and the pressing member 96 is set inwardly away from the abutment surface between the positioning protrusion 49 of the partition 32 and the pressing member 96. This makes it possible to prevent the supported piece 66 of the flexible film 64 from being clamped vertically by an excessive force, and to largely obtain the abutting force between the seal abutment surface 31 of the sealing rubber 30 and the seal rib 54 of the lid member 36, by avoiding a drop due to clamping of the supported piece 66.

The seal rib 54 of the present practical embodiment extends in the circumferential direction with a roughly semicircular cross section, and its surface has a smoothly curved shape without a break point or a broken line. Thus, occurrence of cracks in the sealing rubber 30 due to the pressing of the seal rib 54 or the like is prevented.

In addition, the seal rib 54 is pressed against the lower surface of the sealing rubber 30 prior to the other portion of the press-sealing face 56. Thus, when the other portion of the press-sealing face 56 is pressed against the lower surface of the sealing rubber 30, deformation of the sealing rubber 30 in the axis-perpendicular direction is restricted by the seal rib 54, and escape of the sealing rubber 30 to the radially inner side and to the radially outer side is suppressed. As a result, it is possible to press the press-sealing face 56 more strongly against the sealing rubber 30, thereby improving the sealing performance.

Further, since the seal rib 54 is provided on the partition 32 to be rigid, when the seal rib 54 is pressed against the sealing rubber 30 of the main rubber elastic body 16, the seal rib 54 is pressed so as to be wedged into the sealing rubber 30 without collapsing or falling down in the direction of protrusion. This makes it possible to obtain a large contact pressure between the seal rib 54 and the sealing rubber 30, so that even if the press-sealing face 56 of the partition 32 is pressed relatively weakly against the sealing rubber 30 of the main rubber elastic body 16, excellent sealing performance can be obtained. In addition, since the seal rib 54 is rigid, it is also possible to effectively restrict the escape of the sealing rubbers 30 to the radially inner side and the radially outer side by pressing of the seal rib 54. Note that the seal rib 54 of the present practical embodiment gradually narrows toward the protruding distal end side, thereby more effectively obtaining the large contact pressure between the seal rib 54 and the sealing rubber 30.

Besides, the inner flange-shaped part 24 is provided to the outer member 14, and the sealing rubber 30 is vertically compressed between opposed faces of the inner flange-shaped part 24 of the outer member 14 and the press-sealing face 56 of the partition 32. This makes it possible to stably press the press-sealing face 56 against the sealing rubber 30 with a predetermined contact pressure, thereby realizing the desired sealing performance with excellent reliability.

Moreover, in the present practical embodiment, since the seal rib 54 provided on the press-sealing face 56 of the partition 32 is disposed at a position overlapping with the inner flange-shaped part 24 of the outer member 14 in the axial direction, the sealing rubber 30 is vertically compressed between the seal rib 54 and the inner flange-shaped part 24. With this configuration, even if the seal rib 54 is strongly pressed against the sealing rubber 30, damage to the sealing rubber 30, peeling of the sealing rubber 30 from the outer member 14 and the like are prevented.

Further, the seal abutment surface 31 of the sealing rubber 30 is remote downwardly from the surface of the main rubber elastic body 16 anchored to the inclined surface 25 of the outer member 14. Thus, even when a tensile force in the axial direction is exerted on the main rubber elastic body 16, the main load bearing surface of the outer member 14 side is the inclined surface 25 provided on the upper end surface of the outer member 14, Since the transmission of the tensile force to the seal abutment surface 31 in the main rubber elastic body 16 is suppressed, the contact pressure between the seal abutment surface 31 of the sealing rubber 30 and the press-sealing face 56 of the partition 32 is more stably maintained.

Figure 15:
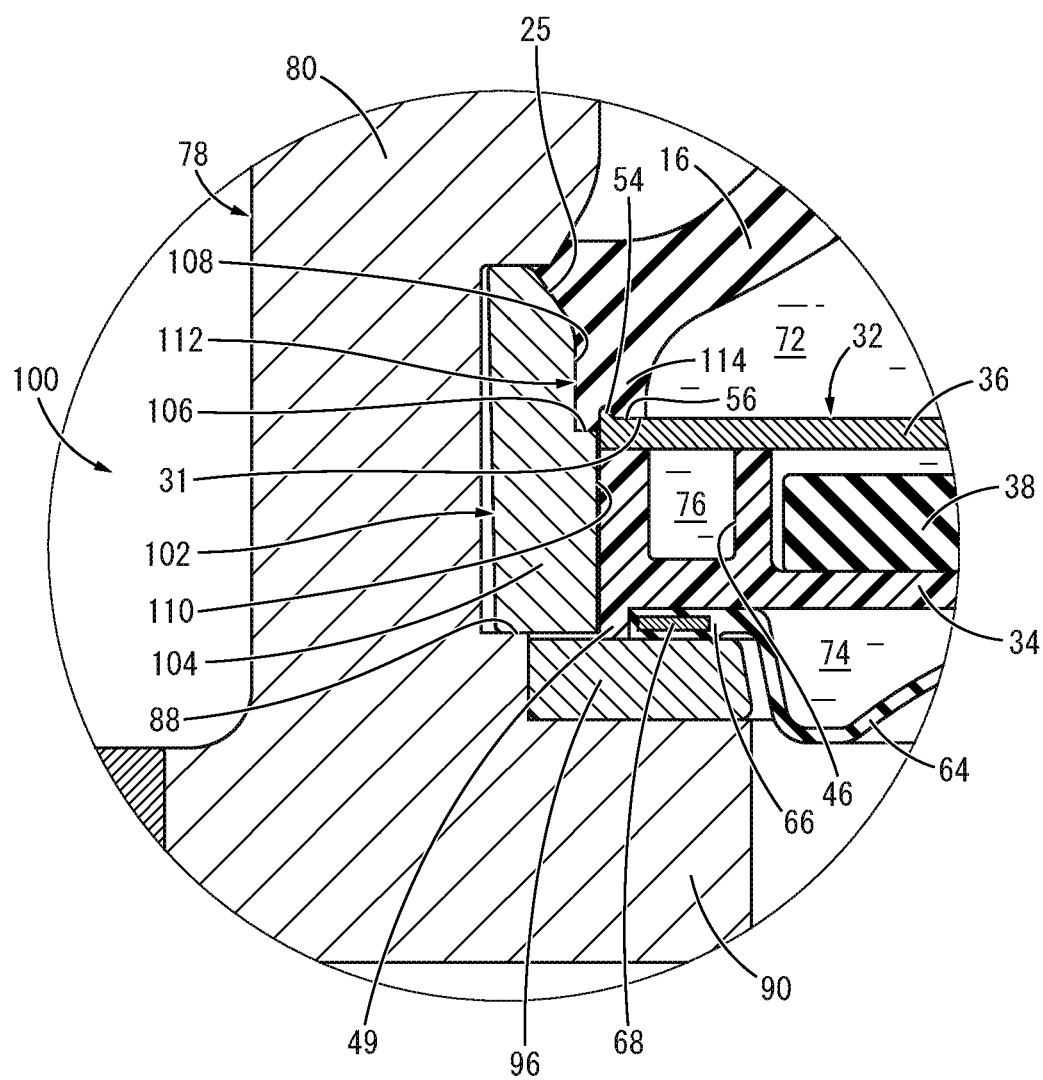
FIG. 15 is a cross-sectional view showing a principal part of an engine mount according to a second practical embodiment of the present invention.

FIG. 15 shows a principal part of an engine mount 100 serving as a fluid-filled vibration damping device according to a second practical embodiment of the present invention. In the following description, components and parts that are substantially identical with those in the first practical embodiment will be assigned like symbols and not described, in any detail.

Described more specifically, the engine mount 100 is provided with an outer member 102, The outer member 102 includes a tubular part 104 having a roughly quadrangular tube shape, and a stepped face 106 extending in the roughly axis-perpendicular direction is provided on the axially middle portion of the radially inner surface of the tubular part 104. Accordingly, the radially inner surface of the tubular part 104 is configured such that the upper side (i.e., the first axial side) of the stepped face 106 comprises a large-diameter rubber anchoring face 108, while the lower side (i.e., the second axial side) of the stepped face 106 comprises a small-diameter partition mounting face 110.

The radially inner surface of the tubular part 104 has a roughly quadrangular tube shape overall and is curved in an arcuate shape at the corners of the tubular part 104, so as to have a smoothly continuous shape without a break point or a broken line in the circumferential direction. In the present practical embodiment, the rubber anchoring face 108 and the partition mounting face 110 of the tubular part 104 each have a roughly quadrangular tube shape in which the corners are curved in an arcuate shape. Further, the outer peripheral surface of the tubular part 104 of the present practical embodiment has a roughly quadrangular tube shape that corresponds to the radially inner surface thereof.

The outer peripheral surface of an annular anchoring end 112 constituting the axially lower end portion of the main rubber elastic body 16 is anchored to the rubber anchoring face 108 of the tubular part 104 of the outer member 102, and the lower end surface of the annular anchoring end 112 of the main rubber elastic body 16 is anchored to the stepped face 106 of the tubular part 104.

In addition, the width dimension of the stepped face 106 is made smaller than the width dimension of the lower end surface of the annular anchoring end 112 of the main rubber elastic body 16, and the radially inner portion of the annular anchoring end 112 comprises a sealing rubber 114 protruding further inward than the stepped face 106. That is, the sealing rubber 114 of the main rubber elastic body 16 protrudes further inward than the small-diameter partition mounting face 110 set on the radially inner surface of the tubular part 104. Although the width dimension of the sealing rubber 114 may be roughly constant about the entire circumference, in the present practical embodiment, the width dimension of the sealing rubber 114 is larger at the corner of the annular anchoring end 112 than at the side thereof.

Besides, the partition 32 is inserted in the tubular part 104 of the outer member 102, and the partition 32 is disposed on the radially inner side of the partition mounting face 110 of the tubular part 104.

Moreover, the press-sealing face 56 provided on the upper surface of the outer peripheral end of the partition 32 is pressed against the sealing rubber 114 of the main rubber elastic body 16 from below, and the seal rib 54 provided on the press-sealing face 56 is pressed against the sealing rubber 114 from below. The seal rib 54 of the present practical embodiment is provided on the outer peripheral edge of the partition 32, and is pressed against the outer peripheral end of the sealing rubber 114.

Note that the press-sealing face 56 and the seal rib 54 provided to the outer peripheral end of the partition 32 are positioned on the radially inner side than the partition mounting face 110 and arranged so as not to overlap with the tubular part 104 as viewed in the axial direction.

With the engine mount 100 having such a structure according to the present practical embodiment, the outer peripheral surface of the annular anchoring end 112 of the main rubber elastic body 16 is anchored to the large-diameter rubber anchoring face 108 of the tubular part 104, while the lower surface of the annular anchoring end 112 of the main rubber elastic body 16 is anchored to the stepped face 106 of the tubular part 104, so as to obtain a large anchoring area of the main rubber elastic body 16 with respect to the outer member 102.

Therefore, even when the press-sealing face 56 of the partition 32 is pressed against the sealing rubber 114 of the main rubber elastic body 16 in the axial direction and a shearing force or a tensile force acts between the annular anchoring end 112 of the main rubber elastic body 16 and the tubular part 104 of the outer member 102, peeling of the main rubber elastic body 16 from the outer member 102 or the like will be prevented.

This makes it possible to strongly press the press-sealing face 56 of the partition 32 against the sealing rubber 114 of the main rubber elastic body 16, thereby further enhancing the sealing performance between the axial end portion of the main rubber elastic body 16 and the partition 32 as well.

In particular, in the structure in which the annular anchoring end 112 of the main rubber elastic body 16 is anchored to the tubular part 104 of the outer member 102 on the radially outer side than the sealing rubber 114, escape of the sealing rubber 114 to the radially outer side is likely to occur. However, since the seal rib 54 is provided on the outer peripheral edge of the press-sealing face 56, the escape of the sealing rubber 114 is suppressed, thereby advantageously realizing the sealing.

Although the practical embodiments of the present invention have been described in detail above, the present invention is not limited by the specific description thereof. For example, it is sufficient for the outer member 14 to include the tubular part 22 anchored to the main rubber elastic body 16, and the outer member 14 may also include a structure for attachment to a vehicle body provided to the outer bracket 78 or the like.

Furthermore, the shape of the tubular part 22 of the outer member 14 is not particularly limited. Specifically, the tubular part 22 may be a cylindrical shape, an irregular tube shape, a polygonal tube shape other than a quadrangular one, or the like in addition to the quadrangular tube shape exemplified in the preceding practical embodiments.

Moreover, in the preceding practical embodiment, the entire press-sealing face 56 of the partition 32 is constituted by the lid member 36. However, for example, at least a portion of the press-sealing face 56 may be constituted by the partition main body 34. Besides, the cross-sectional shape of the seal rib 54 is merely exemplary, and can be appropriately changed according to required sealing performance, durability, and the like. As a specific example, in the preceding practical embodiment, the seal rib 54 is formed on the lid member 36, and the lid member 36 is partially thickened at the formation site of the seal rib 54. However, it would also be acceptable to form a seal rib by pressing the outer peripheral portion of the lid member made of a flat plate material so that the upper surface side thereof becomes convex.

What is claimed is:

1. A fluid-filled vibration damping device comprising:
   an inner member;
   an outer member including: (a) a tubular part, and (b) a stepped face that is disposed on a radially inner surface of the tubular part;
   a main rubber elastic body elastically connecting the inner member and the outer member to each other, the main rubber elastic body having an axial end portion anchored to an radially inner surface of the tubular part of the outer member, and the axial end portion including a sealing rubber;
   a partition disposed on a radially inner side of the tubular part of the outer member, the partition including a press-sealing face positioned at an outer peripheral edge of an axial end face of the partition, the partition being pressed against an axial end face of the sealing rubber at the press-sealing face;
   a primary liquid chamber and an auxiliary liquid chamber formed on opposite sides of the partition, the primary liquid chamber and the auxiliary liquid chamber being filled with a non-compressible fluid; and
   an orifice passage through which the primary liquid chamber and the auxiliary liquid chamber communicate with each other, the orifice passage being formed in the partition; and a seal rib protruding axially outward from the press-sealing face of the partition is more strongly pressed against the axial end face of the sealing rubber than a portion of the press-sealing face that is away from the seal rib such that a fluid-tight sealing is provided axially between the sealing rubber and the partition, wherein:

the radially inner surface of the tubular part includes: (i) on an upper axial side of the stepped face, a rubber anchoring face to which an outer peripheral surface of the axial end portion of the main rubber elastic body is anchored, and (ii) on a lower axial side of the stepped face, a partition mounting face in which the partition is arranged in an inserted state, the radially inner surface of the tubular part having a larger diameter at the upper axial side of the stepped face than at the lower axial side of the stepped face, the axial end portion of the main rubber elastic body is anchored to the rubber anchoring face and the stepped face, the sealing rubber of the main rubber elastic body protrudes further inward than the stepped face, and an entirety of the seal rib is provided on the outer peripheral edge of the partition, and is provided on a radially inner side than the partition mounting face having a smaller diameter at the lower axial side of the stepped face than the upper axial side.

2. The fluid-filled vibration damping device according to claim 1, wherein the partition is formed of a material having a smaller specific gravity than that of iron.

3. A fluid-filled vibration damping device comprising:
an inner member;
an outer member including a tubular part;
a main rubber elastic body elastically connecting the inner member and the outer member to each other, the main rubber elastic body having an axial end portion anchored to an radially inner surface of the tubular part of the outer member, and the axial end portion including a sealing rubber;
a partition disposed on a radially inner side of the tubular part of the outer member, the partition including a press-sealing face positioned at an outer peripheral edge of an axial end face of the partition, the partition being pressed against an axial end face of the sealing rubber at the press-sealing face;
a primary liquid chamber and an auxiliary liquid chamber formed on opposite sides of the partition, the primary liquid chamber and the auxiliary liquid chamber being filled with a non-compressible fluid;
an orifice passage through which the primary liquid chamber and the auxiliary liquid chamber communicate with each other, the orifice passage being formed in the partition; and
a seal rib protruding axially outward from the press-sealing face of the partition is more strongly pressed against the axial end face of the sealing rubber than a portion of the press-sealing face that is away from the seal rib such that a fluid-tight sealing is provided axially between the sealing rubber and the partition, wherein:

the outer member includes an inner flange-shaped part protruding inward from the tubular part, and at least a portion of the press-sealing face of the partition is disposed in opposition to the inner flange-shaped part in an axial direction, the sealing rubber of the main rubber elastic body is anchored to a face of the inner flange-shaped part opposed to the press-sealing face such that the sealing rubber is arranged axially between the press-sealing face and the inner flange-shaped part, the seal rib of the partition is formed on a portion of the press-sealing face opposed to the inner flange-shaped part and an entirety of the seal rib is disposed at a position overlapping with the inner flange-shaped part as viewed in the axial direction, the primary liquid chamber is formed between the partition and the main rubber elastic body at one side of the partition, a flexible film is disposed at the other side of the partition, and the auxiliary liquid chamber is formed between the partition and the flexible film, and the flexible film has a supported piece overlapped with the partition from below the partition, and the seal rib is disposed radially outwardly away from the supported piece.

4. The fluid-filled vibration damping device according to claim 1, wherein:
the primary liquid chamber is formed between the partition and the main rubber elastic body at one side of the partition.
a flexible film is disposed at the other side of the partition, and the auxiliary liquid chamber is formed between the partition and the flexible film, and
the flexible film has a supported piece overlapped with the partition from below the partition, and the seal rib is disposed radially outwardly away from the supported piece.

* * * * *